Oct. 18, 1932.   R. J. WATERWORTH   1,883,152
FOLDING MACHINE
Filed July 29, 1926   12 Sheets-Sheet 1

Fig.1.

Oct. 18, 1932.   R. J. WATERWORTH   1,883,152
FOLDING MACHINE
Filed July 29, 1926   12 Sheets-Sheet 4

Oct. 18, 1932.  R. J. WATERWORTH  1,883,152
FOLDING MACHINE
Filed July 29, 1926   12 Sheets-Sheet 5

Fig. 5.

ROBERT J. WATERWORTH, *Inventor*
By Toulmin & Toulmin
*Attorneys.*

Oct. 18, 1932.  R. J. WATERWORTH  1,883,152
FOLDING MACHINE
Filed July 29, 1926  12 Sheets-Sheet 6

INVENTOR.
ROBERT J. WATERWORTH,
BY
ATTORNEYS.

Oct. 18, 1932.   R. J. WATERWORTH   1,883,152
FOLDING MACHINE
Filed July 29, 1926   12 Sheets-Sheet 10

Oct. 18, 1932.    R. J. WATERWORTH    1,883,152
FOLDING MACHINE
Filed July 29, 1926    12 Sheets-Sheet 11

INVENTOR.
ROBERT J. WATERWORTH,
BY
ATTORNEYS.

Fig.18.

Patented Oct. 18, 1932

1,883,152

UNITED STATES PATENT OFFICE

ROBERT J. WATERWORTH, OF SIDNEY, OHIO, ASSIGNOR, BY MESNE ASSIGNMENTS, TO DEXTER FOLDER COMPANY, OF NEW YORK, N. Y., A CORPORATION OF NEW YORK

FOLDING MACHINE

Application filed July 29, 1926. Serial No. 125,777.

My invention relates to folding machines.

It is one object of my invention to provide a folding machine of unitary construction, which is adapted to fold paper sheets in approximately five hundred different folds.

It is a further object to provide means whereby the sheets may be folded in any desired manner without disassembling the machine and reconstructing it, as has hereto been customary in the art.

It is another object to provide a machine in which, by simple movements of the parts or shifting them from one position to the other, this large variety of folds may be secured, thus greatly economizing in time and labor and securing a high efficiency for this type of machine.

It is another important object of my invention to provide a machine which is adaptable to both mechanical and hand feed, and a machine in which the paper sheets may pass through any given portion of the machine and be ejected at different stages in different states of folding, without the necessity of running the sheets through the entire machine. Thus, where it is desired to produce a fold on a part of the mechanism, the sheet can be ejected after the folding operation takes place without the necessity of waiting for the sheet to pass through the rest of the machine.

It is another object of my invention to provide, in combination with this folding mechanism, automatic stacking mechanism adjustable to varying sizes of folded sheets.

I also provide means for adjusting this packing mechanism.

Referring to the drawings.

In referring to right angle folds, the term right angle is used in reference to a previous fold, and not with reference to a right angle folding of the sheet, as is customary in the trade.

Referring to the drawings in detail, 1 is a frame having an overhanging feed ledge 2, upon which are mounted a plurality of supporting plates 3 between which move the feeding tapes 4. These tapes are mounted upon rolls 5 and 6, and are maintained taut by a tension roll 7 supported on an arm 8 pivoted on the frame 2 at 9.

Figure 2:
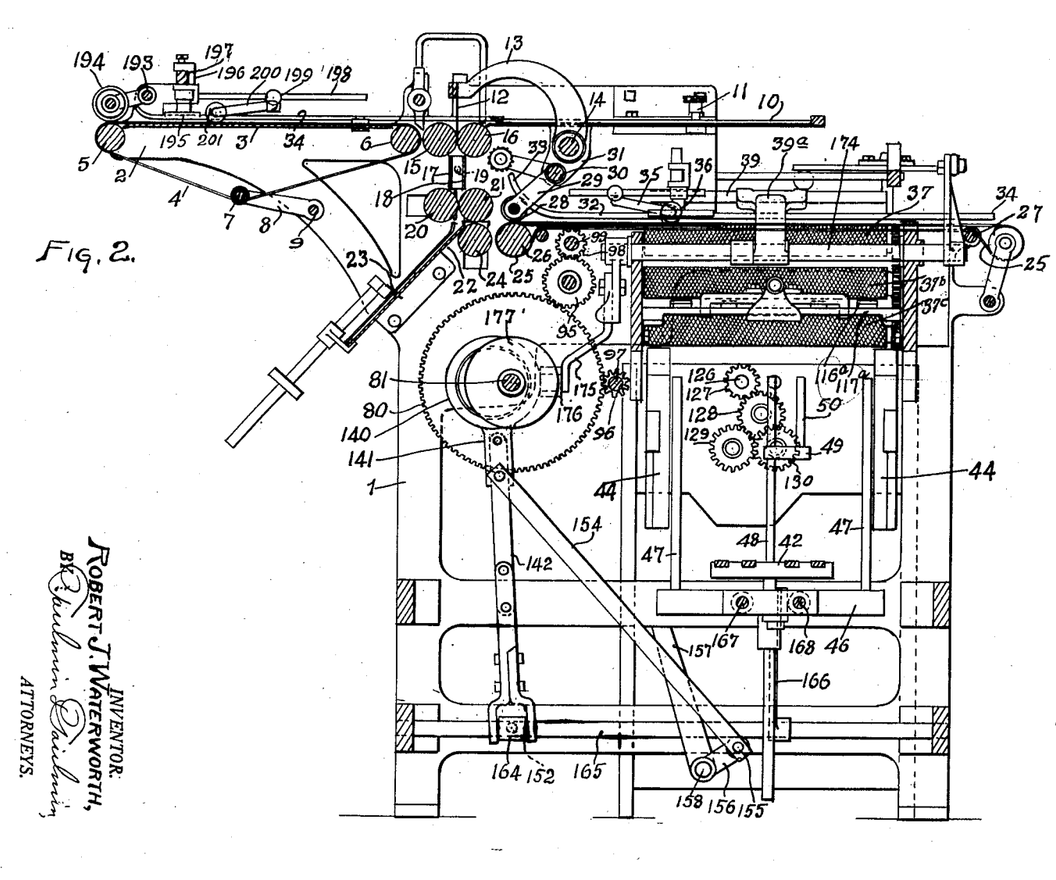
Figure 2 is a section on the line 2—2 of Figure 1.

The paper enters at the left hand side of the machine, as viewed in Figure 2, passing over the plate and tapes which, in turn, pass the paper through the machine into the oppositely-disposed, paper-supporting plate 10 until the paper engages the abutment 11. At this moment, the knife 12 carried on the end of an arcuate arm 13, which is pivoted at 14, descends and engages the paper. This causes the paper to be folded and to enter along the line of its crease for the initial folding thereof between the rolls 15 and 16. It then comes in contact with a deflector bar having spaced walls 17 and 18 and pivotally supported at 19. This deflector bar is adapted to pass paper to either side of or directly through it. The folded paper, in this instance, may pass through the deflector bar between the rolls 20 and 21 into the space between the paper guide 22 against the stop 23 and then buckle passing through the rolls 21 and 24 to the paper-supporting tapes 25, mounted on the rollers 26 and 27. The rollers 28 carried on the arms 29, pivoted at 30 on the bracket 31, provide means of holding the paper sheets, thus folded in engagement with the actuating tapes and supporting fingers 32. The rods with the ends turned up, as at 33, are designated 34. These rods assist in keeping the paper on the moving support. Additional rollers for the purpose of maintaining the paper on the support are supported on the arms 35, the rollers being designated 36.

If it is desired to direct the paper directly from between the rollers 15 and 16 to the right hand of the roll 21 and immediately up on to the tapes 25, then the deflector bar is turned to so divert the paper, thus omitting one fold. In this case the deflector is turned turned at an angle, with the wall 18 in the path of the paper. This causes the paper to be deflected to the right of roller 21 and in between the rollers 28 and the tapes 25, whereupon the tapes feed the paper. If desired, the arm 29, carrying the rollers 28, may be moved upwardly to permit the paper to pass under the upturned ends 33 of the arms 34, although in the machine it is not necessary to do this because the paper can pass between the roller 21 and the arms 34. When the rollers 28 are so moved, the arms 35 are moved so that the rollers 36 will engage the paper just back of the upturned ends of the arms 34. When the paper has been so treated, it may be immediately ejected laterally of the machine as desired as it passes over the tapes 25, or, if desired, it may pass into the second folding mechanism. This second folding mechanism can be seen somewhat more plainly in plan view in Figure 4.

Figure 4:
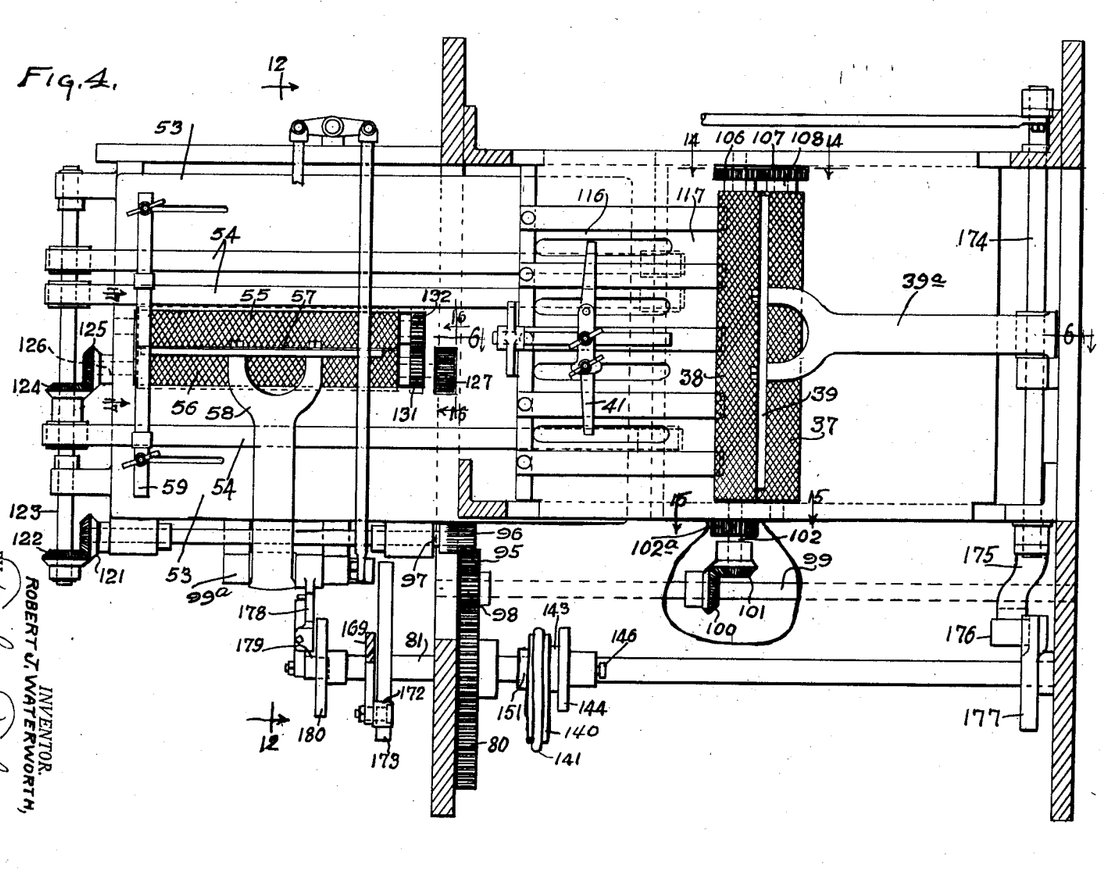
Figure 4 is an enlarged plan view with a portion of the view taken on the line 4—4 of Figure 3.
Figure 5:
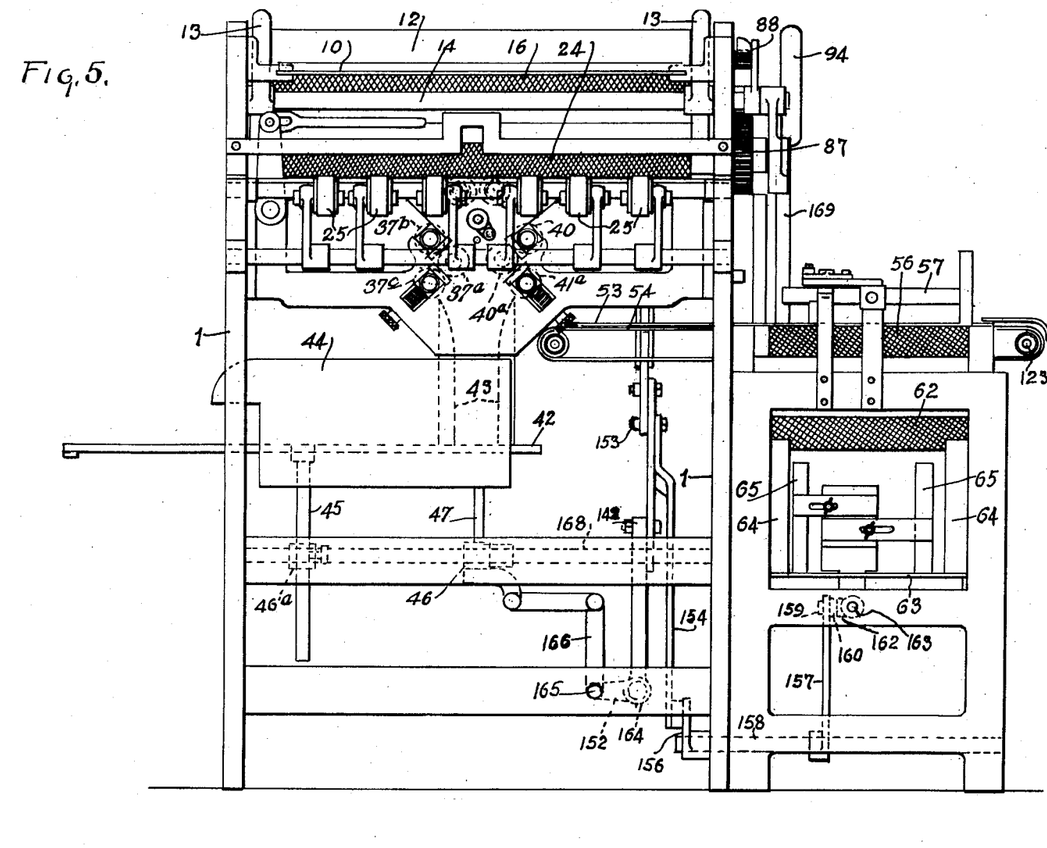
Figure 5 is an end elevation of the machine.
Figure 6:
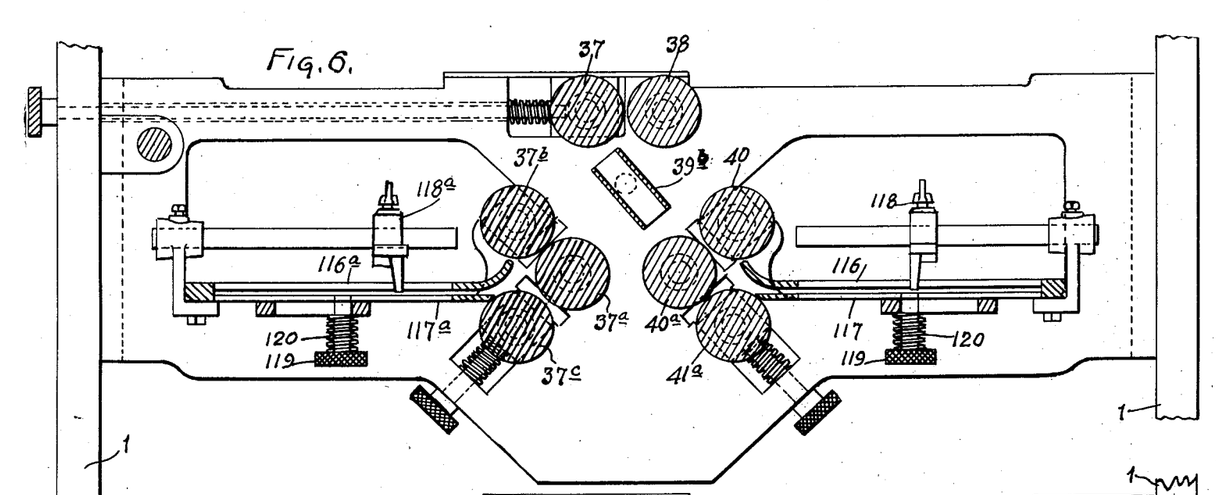
Figure 6 is a detail view of the supporting frame and the roll so supported in section, together with a paper guide showing the means of sliding the paper guide out of paper-engaging position so as to permit the paper to pass directly out of the machine without touching the guide; this section is on the line 6—6 of Figure 4.
Figure 7:
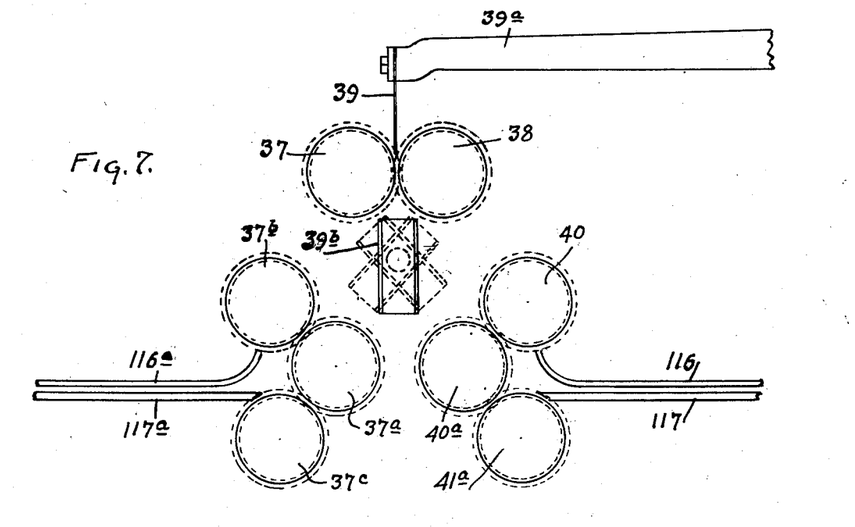
Figure 7 is a diagrammatic view showing the method of directing the paper into the stacker.
Figures 8, 9, 10:
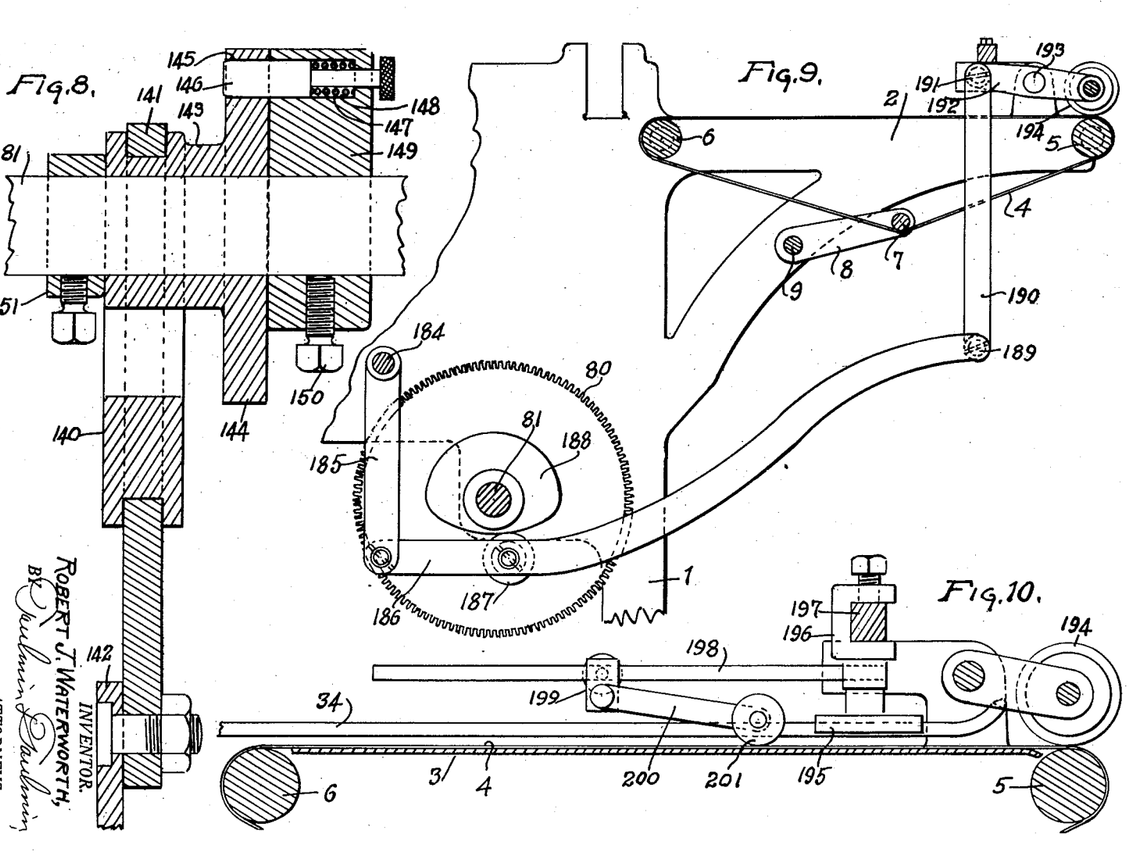
Figure 8 is a detail view in section of the eccentric adjustment of the packer control.
Figure 9 is a diagrammatic view of the parts constituting the hand feed mechanism.
Figure 10 is a section on the line 10—10 of Figure 1, showing the arrangement of the retarder roll support.
Figure 11:
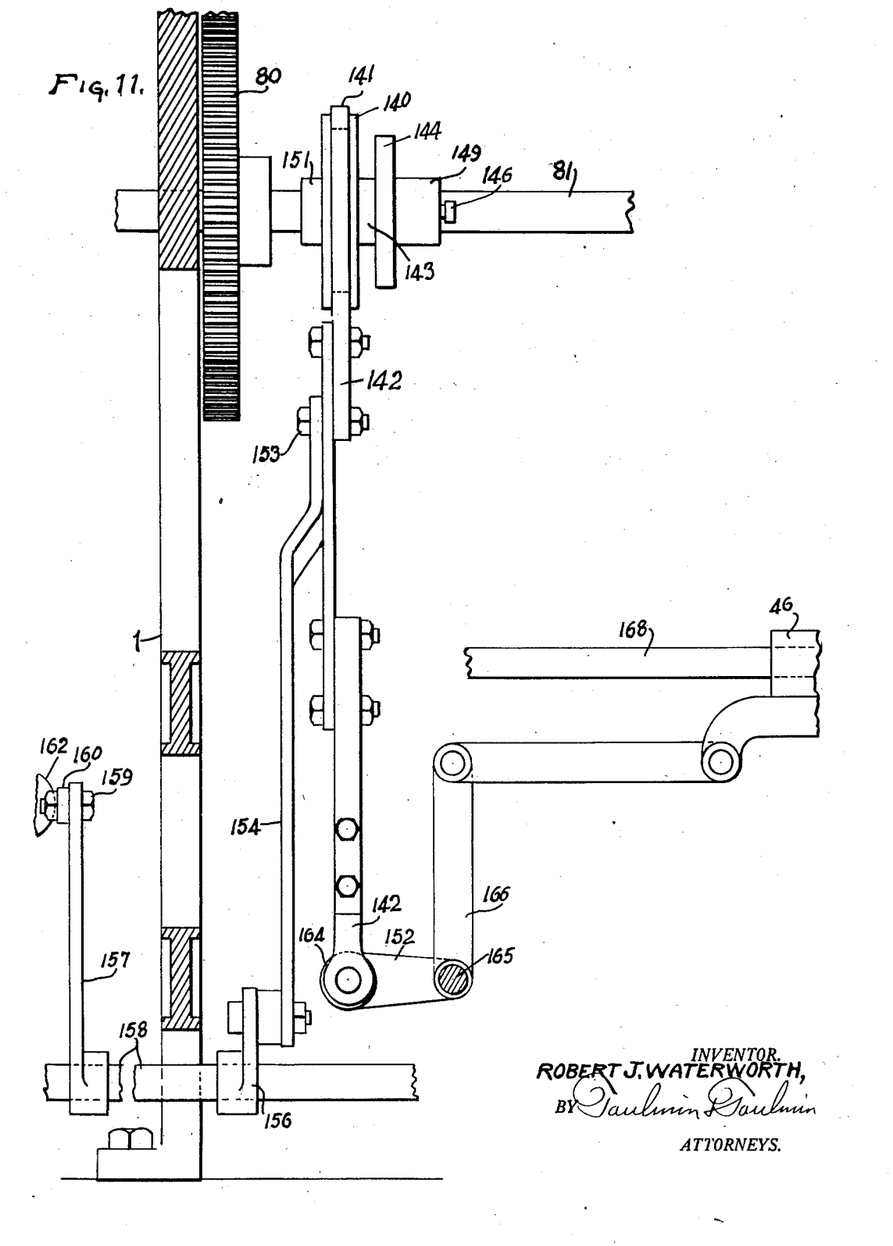
Figure 11 is a detail view of the eccentric adjustment mechanism in elevation with the supporting shafts in section for the packer control.

The sheets pass over the rollers 37 and 38 beneath the knife 39 carried on the arm 39a, engaging with a stop not shown. At this moment, the knife 30 descends, forcing the folded sheet between the rollers to impart to the sheet the first right angle fold to a previous fold. The sheet passes through the rollers 37 and 38 and either passes through the deflector bar 39b or to one side thereof. If it passes to the right hand side, as in Figure 6, between the rollers 40 and 40a, it will pass between the paper guide members 116 and 117 of a grid where it will engage with a stop 118 and be caused to buckle and return in buckled form between the rollers 40a and 41a whence it will pass downwardly into the packer.

If the paper receiver or grid 117 and 116 (Fig. 6) is moved bodily backwardly through the means of the bolt 119 and spring 120 so that the paper can pass directly between the rollers 40 and 40a, the paper will pass by the ends of the paper receiving members 117 and 116 and thence into the second right angle folding mechanism on top of the tapes 54 and receiving plates or fingers 53 over the top of the roller 41a.

On the other hand, if the paper is to pass directly to the packer, it will pass between the rollers 37 and 38 through the deflector 39b, between the rollers 40a and 37a to the packer. If the deflector bar is turned so as to divert the paper between the rollers 37a and 37b the paper will pass between members 116a and 117a of a grid against the stop 118a and buckle, so that the paper will be drawn between the rollers 37a and 37c passing into the packer for the stacked sheets.

If the paper sheets pass directly through the deflector bar 39b, they will descend on to the adjustable platform 42 being guided into position on their edges by the spaced pair of guiding fingers 43 carried by the side boards 44.

This support for the stacked sheets is supported on an upright 45, which is adjustably mounted in the bracket 46a. A transverse bracket or sliding bar 46 having upwardly-extending arms 47 and 48 for packing the sheets on the platform, slides on the rods 167 and 168. The arms 47 and 48 are reciprocated to pack the sheets. This reciprocation is caused by an eccentric 140 and an eccentric strap 141, which cause the arm 142 to rock an arm 164 mounted on a shaft 165. This rocks the shaft 165 and this causes an arm 166 to rock. This movement is transmitted to the bracket or sliding member 46 and the packing arms 47 and 48. In this way the packing arms are reciprocated to pack the sheets on the platform 42. The central arm 48 is provided with a bracket 49 and another parallel short arm 50 to pack the sheets, particularly the smaller sheets, when folded, when the platform 42 has been elevated just beneath the bracket 49. In this case the side-boards 44 are adjusted toward each other for the smaller sheets, and the arms 47, 47 are removed. The top of the arm 48 and the arm 50 are then reciprocated to pack the sheets.

If it is desired, the folded sheets can be directed between the rollers 40 and 40a on to the paper-supporting fingers 53 and tapes 54 so that the sheets, which have been folded with a right angle fold, may proceed to a second right angle folding mechanism, now to be described.

Figure 1:
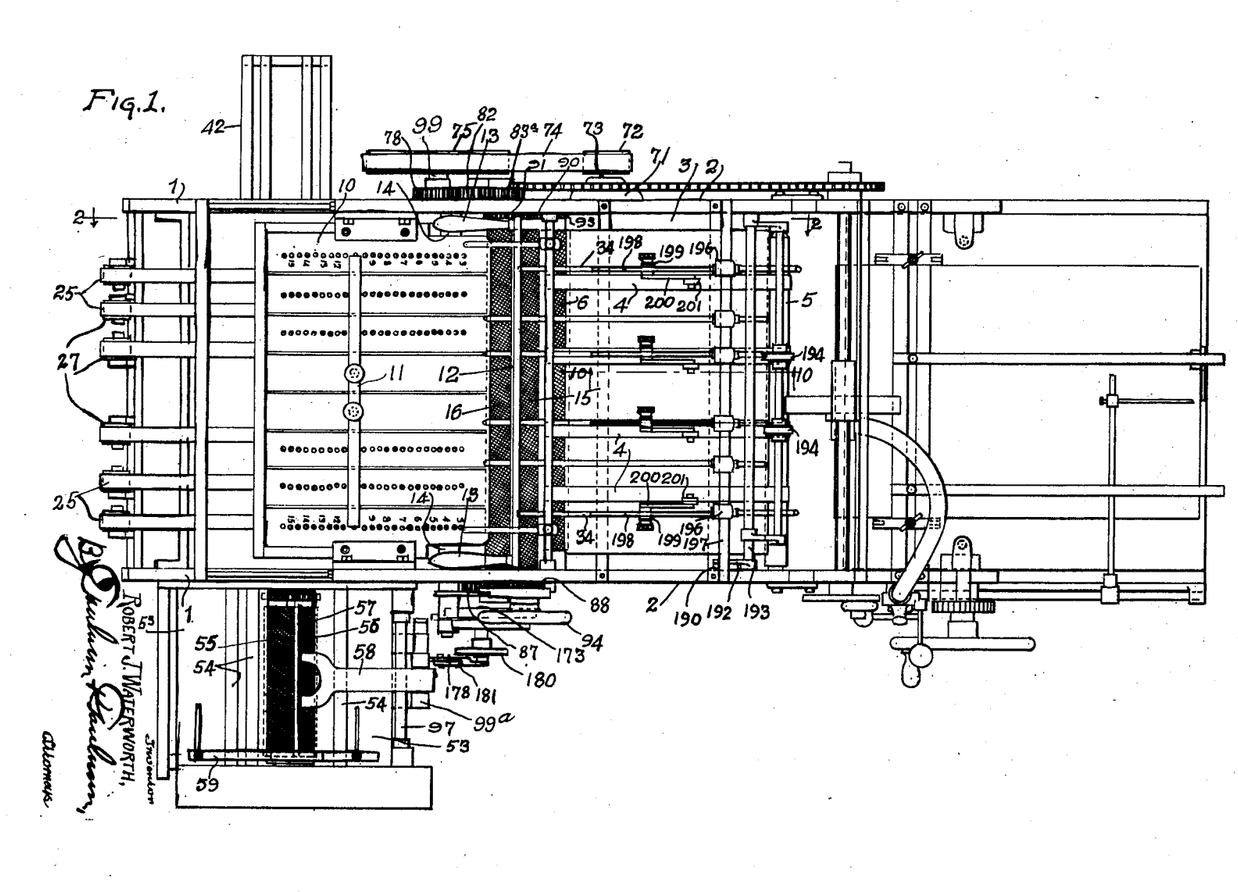
Figure 1 is a plan view of the machine, showing a typical attachment of a mechanical feature.

This second right angle folding mechanism can be seen in plan view in Figure 1 at the lower left hand portion of the sheet. It also can be seen in plan view enlarged in Figure 4 at the left hand side of the machine.

The sheets to be delivered to this second right hand folding mechanism (Figure 12) pass over the rollers 55 and 56 beneath the knife 57 supported on the arm 58. The sheets pass the full length over the usual tapes 54 and fingers 53 until they engage the adjustable abutment 59, at which time the knife 57 descends moving the sheet between the rollers 55 and 56 to impart to the sheet a second right angle fold. The sheet is drawn down between the two rollers 55 and 56 where it either passes to one side of the deflector bar 57a between the rollers 58 and 59 into the paper guides 60 against the stop 61 where it is caused to buckle between the rollers 59 and 62 and then descends to the stacker platform 63 between the side walls 64 being guided thereto by the stacker fingers 65 and a stacker mechanism to be hereinafter described.

Figure 12:
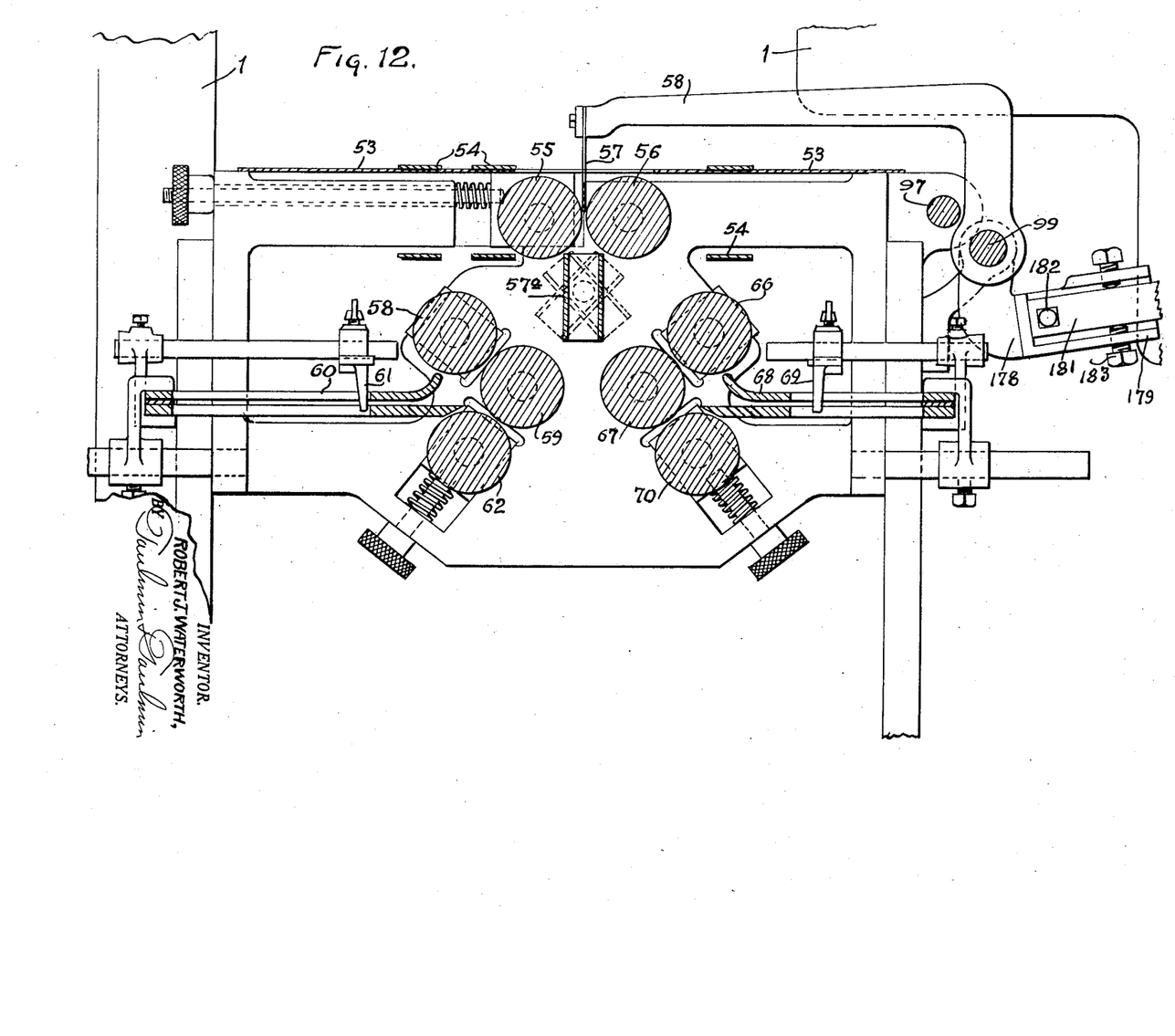
Figure 12 is a section on the line 12—12 of Figure 4 showing the second right angle fold mechanism.
Figure 13:
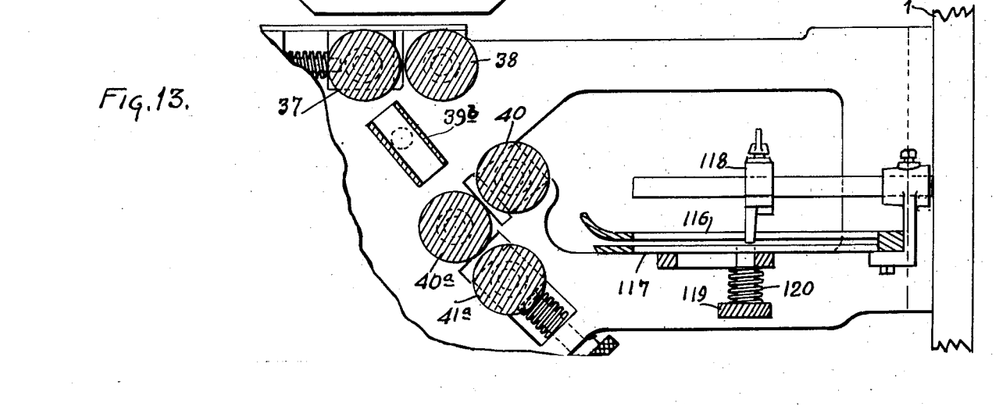
Figure 13 is a detail view of the second right angle fold mechanism, buckler withdrawn.
Figure 14:
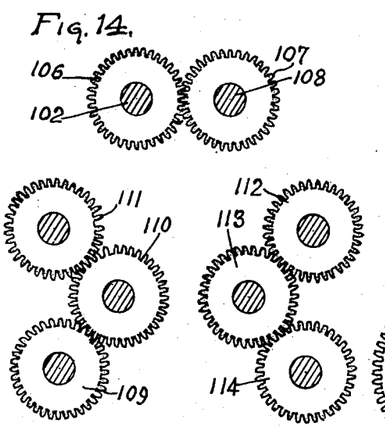
Figure 14 is a detail sectional view of the gearing and partial driving means for the first right angle folding rollers, taken on the line 14—14 of Figure 4.
Figure 15:
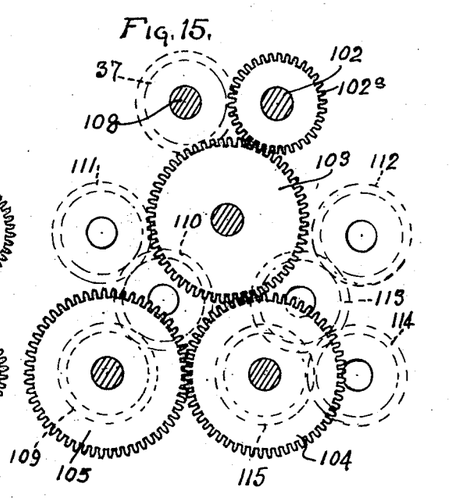
Figure 15 is a detail sectional view of the drive gearing for the first right angle folding rollers, taken on the line 15—15 of Figure 4.
Figures 16, 17:
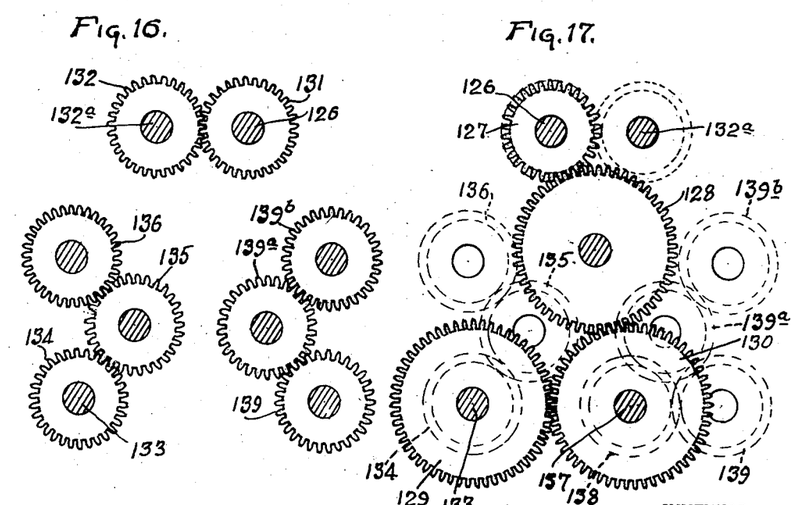
Figure 16 is a detail sectional view of the gearing and partial driving means for the second right angle folding rollers, taken on the line 16—16 of Figure 4.
Figure 17 is a detail sectional view of the drive gearing for the second right angle folding rollers, taken on the line 17—17 of Figure 4.

Or the paper may pass directly down between the rollers 55 and 56 through the deflector 57a.

Or the paper may be diverted by the deflector bar to the right hand between the rollers 66 and 67 in to the paper guide 68 against the stop 69 being caused to buckle and pass between the rollers 67 and 70 in to the stacker.

*Driving mechanism*

Figure 18:
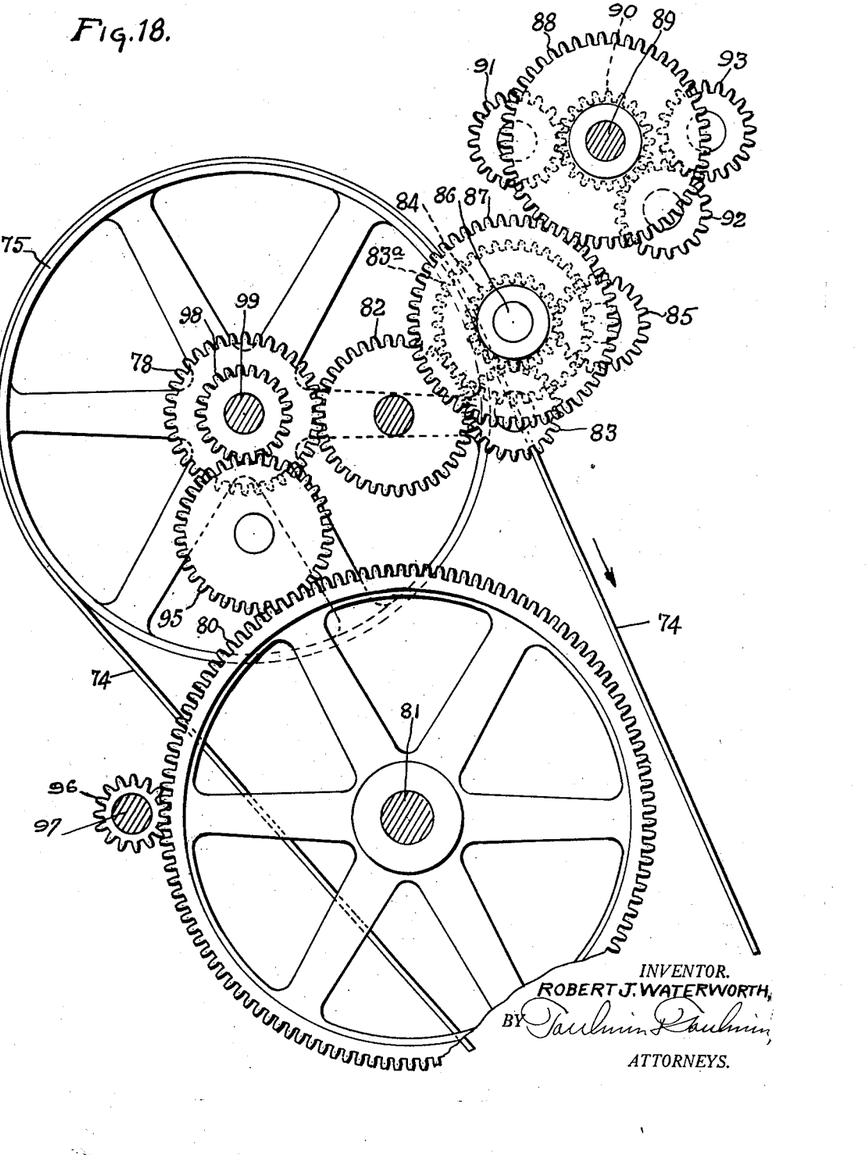
Figure 18 is an enlarged detail view of the driving mechanism through which motion is imparted to the first right angle folding mechanism, tape rollers therefor and also to the knife devices of the second right angle folding mechanism.

Turning to the driving mechanism, 71 (Fig. 3) is a motor mounted on the frame having a driving pulley 72 on its armature 73 driving the belt 74 in the direction indicated by the arrow, Fig. 18. This belt 74, in turn, drives a large drive wheel 75 mounted on the primary power shaft 99. This power shaft 99 has thereon a pinion 98 and a gear 78. The pinion 98 drives an idler gear 95, which, in turn, drives a master gear 80 mounted on the second main shaft 81.

This second main shaft 81 carries the hereinafter described eccentric packing operating mechanism and the knife operating cams.

Referring to drive shaft 99 that the gear 78 thereon engages with and drives a gear 82 which in turn transmits motion to a shaft 86 through the medium of a gear 83a. Shaft 86 is also provided with a gear 84 which imparts motion to gears 83 and 85. This shaft also has secured thereon the gear 87 which imparts motion to a shaft 89 through the gear 88. This shaft 89 is also provided with a gear 90 whose purpose is to impart motion to gear 91 secured to the roller shaft 16 of the first folding mechanism, to gear 92 which in turn drives the gear 93 secured to the shaft of the tape rollers of the first folding and conveying mechanism. The outer end of shaft 89 is provided with the hand wheel 94 for convenience and use of operator when necessary to make changes and adjustments at various times. The power is shut off whenever the operator is about to use this hand wheel.

Turning to the gear 80, Fig. 18, it will be noted that it meshes with a pinion 96 on the shaft 97. The gear 80 drives the pinion 96 on the shaft 97 which furnishes power for the gears controlling the rollers of the second right angle folding mechanism. The pinion 98 is mounted on the shaft 99 which furnishes power for the roller gears composing the first right angle folding mechanism.

Referring to the gearing of the first right angle folding mechanism, it will be noted that the shaft 99 carries a bevel pinion 100 engaging with a bevel pinion 101 on the shaft 102, which carries the roller 38. The gear 102a meshes with the gear 103, which, in turn, engages with a gear 104 which meshes with a gear 105. On the other end of the machine, the gear 106 on the shaft 102 engages with a gear 107 on the shaft 108 of the roller 37. It will be observed that the other rollers carry, respectively, the gears 109, 110, 111, 112, 113, 114 and are suitably actuated through an intermediate gear 115.

Turning to the driving mechanism for the second right angle folding mechanism, it will be seen that on both ends of the mechanism will be mounted gearing similar to that on the first right angle folding construction.

This gearing is driven through the shaft 97, bevel gear 121, bevel gear 122, shaft 123, bevel gear 124, bevel gear 125 and shaft 126 and supporting roller 56.

The shaft 126 carries the gear 127. This meshes with the intermediate gear 128, which meshes with gear 130, while gear 129 and the gear 130 meshes with the gear 129. On the other end of the mechanism, the shaft 126 carries the gear 131 which meshes with the gear 132 on shaft 132a.

The shaft 126 carries the gear 127 which meshes with the intermediate gear 128, which, in turn, drives gear 130. Gear 129 is mounted on shaft 133 carrying gears 134. This gear drives gear 135 of roll 59. Gear 135 drives gear 136 of roll 58. Shaft 137 carries the gears 130 and 138, the gear 138 drives the gear 139 on shaft or roll 70, which gear drives the gear 139a of roll 67 and the gear 139b of roll 166 is driven by the gear 139a.

Packer control and adjustment

Referring to the shaft 81, it will be observed that this shaft has mounted thereon an eccentrically-positioned disk member 140 carrying an eccentric strap 141 to which is connected an arm 142. This disk 140 is connected by a sleeve 143 to a disk 144 having a plurality of apertures 145 in which can be inserted a spring-pressed plunger 146 actuated by the spring 147. This plunger and spring are carried in a cutaway portion 148 of a setting disk 149 which is mounted on the shaft 81 and fastened thereto at a predetermined position by the set screw 150.

A collar 151 is mounted on the other side of the eccentric mechanism. This adjustable feature permits of the positioning of the eccentric relative to the shaft at the will of the operator to regulate the timing of the packing mechanism.

The arm 142 is pivoted to the rock arm 164. To this arm is connected pivotally at 153 a link or a pitman 154 which is connected at 155 to a bell crank, consisting of the arms 156 and 157 pivoted at 158 on a suitable transverse shaft carried in the frame. The upper end of the arm 157 is connected at 159 by a link 160, which, in turn, is connected to upright arms 161 which reciprocate within the side boards 64, serving to pack the sheets coming from the second right angle folding mechanism.

The arms 161 are mounted on the cross head 162 which slides back and forth on the supporting rods 163 carried in the frame members.

Referring to the packer mechanism for the first right angle folding mechanism, it will be observed that the pivotal mounting at 152 of the arm 142 is on the end of a crank arm 164 mounted on the shaft 165 rocking that shaft. This shaft carries on it an arm 166, which, in turn, is connected to the cross head 46. This cross head carries the arms 47 and 48, as also the bracket 49 and the upright arm 50, which do the packing. This cross head is guided on the rods 167 and 168.

Knife-operating mechanism

There are three knives allocated one to each folding mechanism and each actuated by cams mounted on the shaft 81.

The knife 12 mounted on arm 13 which is pivoted upon the shaft 14 is actuated through the link 169 which is pivoted at 170 to the arm 13 and adjustably positioned with respect thereto by the set screws 171 carried by the end of the arm 13. The free end of this arm 169 carries a cam roller 172 which engages with a cam 173. The weight of the knife 12 and its supporting arm 13 is sufficient to keep the roller 172 in engagement with the cam 173. If desired, a spring, not shown, may also be used to hold the roller 172 in engagement with the cam 173.

The second knife 39 which is carried on the arm 39a is actuated by the movement of the rod 174 which is journaled in the frame. This rod 174, which rocks the arm 39a, has a lever 175 connected thereto, on the end of which is a cam roller 176 engaging with the cam 177 and shaft 81. The engagement is with the side of the cam.

The third knife 57 carried on the arm 58 is mounted on the shaft 99a to the arm. To this shaft is connected an arm 178 carrying a cam roller 179 adapted to engage with a cam 180. The position of the roller with respect to the arm 178 may be adjusted through the medium of a link 181 on the end of the arm carrying a roller which is pivoted to the arm 182 and is adjustable with respect thereto to the set screws 183.

Hand feed mechanism

The hand feed mechanism is arranged as follows. The shaft 184 suspends a link 185 which has pivoted to its lower end a link 186 on which is a roller 187 intermediate its ends. Such roller engages with the cam 188 on the shaft 81.

The other end of the link 186 is pivotally connected at 189 to a link 190 which is pivotally connected at 191 to a lever 192, such lever being mounted at 193 and carrying on its free end the rollers 194 which are adapted to intermittently engage the paper to insure the gripping of the paper on the actuating tapes.

Retarder rolls

In order to retard the paper and to maintain it in engagement with the tapes and to prevent rebound of the paper when it is travelling on top of the tapes, I provide upon the several rods 34, a plurality of mechanisms of the following character: Preferably one to each rod. I provide a saddle 195 on the rod 34. This saddle is mounted through a jaw 196 on the transverse supporting rod 197. This jaw 196 carries the rod 198 upon which is adjustably mounted by a collar 199 a swinging arm 200 carrying the retarder roller 201, which engages with the upper surface of the paper.

Figure 3:
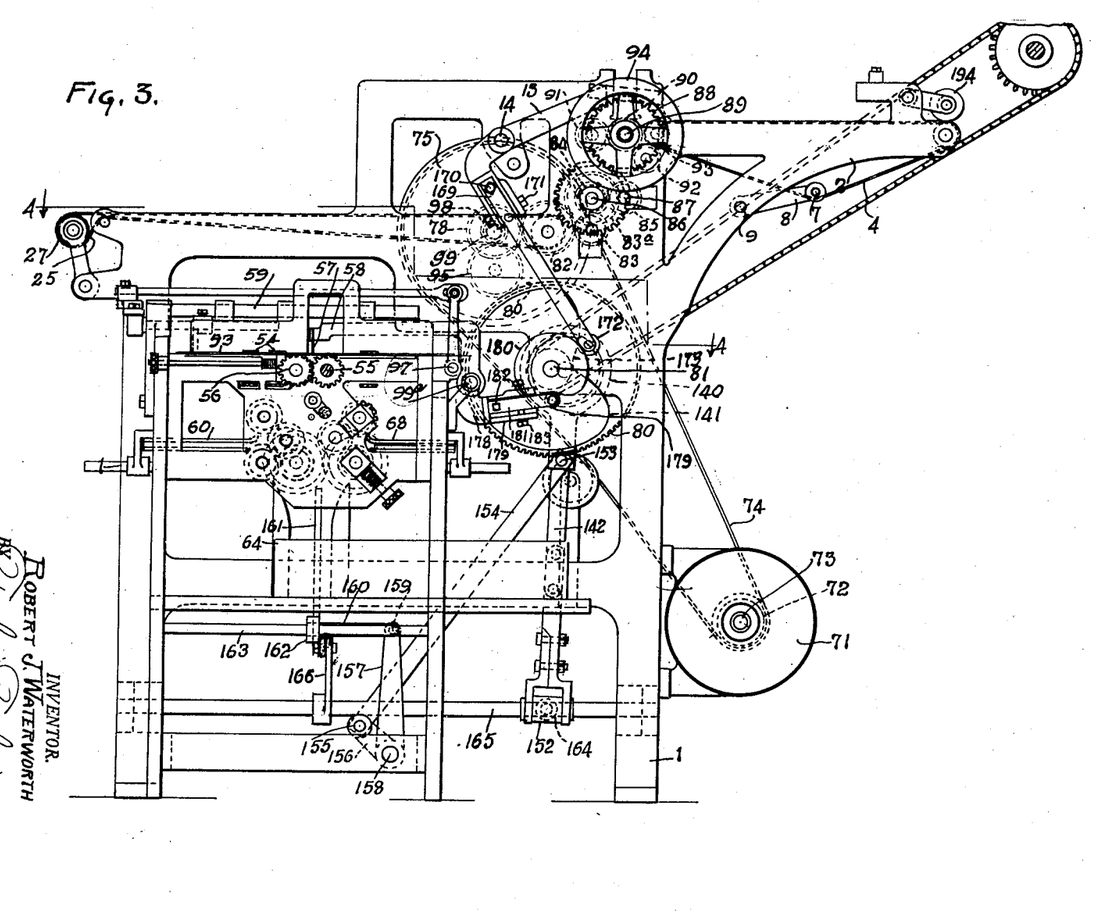
Figure 3 is a side elevation of the machine.

The chain and sprocket shown in the upper right hand corner of Fig. 3, on sheet 3 of the drawings, drive the feeder which delivers the paper to the folding machine. A part of this feeder is also shown at the right hand of Fig. 1 on sheet 1 of the drawings. The feeder is a separate machine, but receives power from the motor 71, which, through the necessary gearing, drives the chain and sprocket shown in Fig. 3 and referred to above. The feeder is no part of the present invention.

This machine will make from one to five folds in one operation, or, in other words, during the passage of the sheet once through the machine. Between the first and second folds I use one of my three-way deflector bars. This permits me to make one fold, skip the second and pass to the third. It also permits me to make the first two folds which are parallel and then pass to the third. From the third fold I can pass to either a fourth left or fourth right fold by use of another of my three-way deflector bars. I can secure two right angle folds if the second and fourth folds are omitted. Then beneath the fifth, I have another three-way deflector bar by which I can pass to the sixth or last buckle fold.

By my machine, I am enabled to make all of the primary folds with the knives so that the paper stock whether cross grained or straight grained can be handled with ease.

I have, therefore, provided a folding machine with eight sets of folding rolls so assembled together that any combination of fifty four folds can be made without any re-arrangement or further assembly of the rollers which has been common practice in the art at the present time.

The printer or binder can, by the movement of the deflectors and a few of the other simple parts of the machine, pass from one style fold to another without any loss of time. I can thus produce fifty four folds running from one to five primary folds, counting each new fold arising from lap-overs as a compounded fold with the result that I can secure a total of 464 folds on this machine. Some of the typical folds so secured are as follows:

Single fold, four-page; two parallel, six-page, standard; two parallel, eight-page; single fold, four-page, followed by one right angle (eight-page); two parallel, six-page, standard, followed by one right angle (twelve-page); two parallel, eight-page, followed by one right angle (sixteen-page); single fold, four-page followed by one right angle, eight-page followed by one parallel (sixteen-page); two parallel six-page, standard, followed by one right angle, twelve-page followed by one parallel (twenty-four page); two parallel, eight-page followed by one right angle sixteen-page followed by one eight-page parallel (24 page); two parallel six-page standard followed by one right angle twelve page followed by one parallel eighteen pages; single fold four-page followed by one right angle eight page followed by one parallel 12-page; two parallel, six-page accordion; two parallel six-page accordion followed by one right angle, twelve-page; two parallel six page accordion followed by one right angle 12 pages followed by one parallel 24 pages; two parallel six page accordion followed by one right angle 12 page followed by one parallel eighteen pages; single fold four-page followed by one right angle eight page followed by one parallel sixteen pages; two parallel six page standard followed by on right angle twelve pages followed by one parallel twenty-four pages; two parallel six page standard followed by one right angle twelve page followed by one parallel eighteen pages; two parallel eight page followed by one right angle sixteen page followed by one eighteen page parallel twenty-four pages; single fold four-page followed by one right angle eight page followed by one parallel twelve pages; two parallel six page accordion followed by one right angle twelve page followed by one parallel twenty-four page; two parallel six-page accordion followed by one right angle twelve page followed by one parallel eighteen page; single fold four page followed by one right angle followed by one parallel twelve pages; single fold four-page followed by two parallel accordion at right angles to first fold, and folded with top flap to left hand (total twelve pages); single fold four-page followed by two parallel accordion at right angles to first fold and folded with top flap to right hand (twelve pages); two parallel eight pages followed by two parallel accordion at right angle to first two folds and folded with top flap to left hand (24 pages); two parallel eight pages followed by two parallel accordion at right angle to first two folds and folded with top flap to right hand (twenty-four pages); two parallel six-page standard followed by two parallel accordion at right angle to first two folds with top flap to left hand (total 18 pages); two parallel six-page standard followed by two parallel accordion at right angle to first two folds with top flap to right hand (total eighteen pages); two parallel six-page accordion followed by two parallel accordion at right angles to first two folds with top flap to left hand (total 18 pages); two parallel six page accordion followed by two parallel accordion at right angles to first two folds with top flap to right hand (total 18 pages); single fold four-page followed by one right angle followed by another right angle (total 16 pages); single fold four-page followed by one right angle followed by another right angle followed by one parallel to right (total 32 pages); single fold four page followed by one right angle followed by another right followed by one parallel to left (total 32 pages); two parallel six-page standard fold followed by one right angle followed by another right angle (total 24 pages); two parallel six-page standard followed by one right angle followed by another right angle followed by one parallel to left (total 36 pages);

two parallel six-page standard followed by one right angle followed by another right angle followed by one parallel to the right (total 36 pages); two parallel six-page accordion followed by one right angle followed by another right (total 24 pages); two parallel six page accordion followed by one right angle followed by another right angle followed by one parallel to left (total 36 pages); two parallel six-page accordion followed by one right angle followed by another right angle followed by one parallel to right (total 36 pages); two parallel gate fold; two parallel gate fold followed by one right angle; two parallel gate fold followed by one right angle followed by another right angle; two parallel gate fold followed by one right angle followed by one parallel to the right; two parallel gate fold followed by one right angle followed by one parallel to the right; two parallel gate fold followed by two parallel accordion fold at right angles to gate fold and with top flap to left; two parallel gate fold followed by two parallel accordion fold at right angles to gate fold and with top flap to right; two parallel gate fold by one right angle followed by another right angle followed by one parallel to left; two parallel gate fold followed by one right angle followed by another right angle followed by one parallel to right; double cover fold with flaps on opposite sides; single fold followed by gate fold at right angle; two parallel eight-page fold followed by gate fold at right angles; two parallel six-page standard followed by gate fold at right angles; two parallel accordion fold followed by gate fold at right angles.

The term right angle fold is used with reference to a previous fold. The first right angle fold, for instance, is at a right angle to a previous fold. In the trade, however, a fold at right angles to the sheet is treated as a right angle fold. If so treated, my machine makes three right angle folds. If treated with respect to previous folds, my machine makes two right angle folds.

It will be understood that I desire to comprehend within my invention such modifications as may be necessary to adapt it to varying conditions and uses.

Having thus fully described my invention, what I claim as new and desire to secure by Letters Patent, is:—

1. In a folding machine, a plurality of knife folders successively arranged at right angles to each other, a plurality of loop folders each parallel with one of said knife folders, and means for selectively guiding sheets from a knife folder to one side of its associated loop folder or through the latter for delivery to a following knife folder.

2. In a folding machine, a plurality of knife folders successively arranged at right angles to each other, a plurality of loop folders each parallel with one of said knife folders, and means for selectively guiding sheets from a knife folder to one side of its associated loop folder or through the latter for delivery to a following knife folder, said means comprising a pivoted deflector and a grid forming part of the last mentioned loop folder and bodily movable into and out of operative relation with the feeding and folding rollers thereof.

3. In a folding machine, a pair of angularly related knife folders, a loop folder associated with one of the knife folders, a grid forming part of the loop folder and bodily movable into and out of operative relation with the feeding and folding rollers thereof, a pivotally mounted deflector interposed between the loop folder and its associated knife folder and adapted to selectively guide sheets to one side of said loop folder or into the feeding rollers thereof, and means for delivering sheets from the feeding rolls of the loop folder to the other knife folder when said grid is moved bodily to its inoperative position.

4. A folding machine including two angularly related knife folders, a loop folder parallel with one of the knife folders and adapted to receive sheets therefrom, and means enabling the sheets to pass said loop folder for delivery to the other knife folder.

5. A folding machine including two angularly related knife folders, a loop folder parallel with one of the knife folders, means for selectively guiding sheets to one side of or into the loop folder, and means enabling sheets to pass said loop folder for delivery to the other knife folder.

6. A folding machine including two angularly related knife folders, a plurality of loop folders parallel with one of the knife folders and selectively adapted to receive sheets therefrom, and means enabling the sheets to pass one of said loop folders for delivery to the other knife folder.

7. A folding machine including two angularly related knife folders, a plurality of loop folders parallel with one of the knife folders, means for selectively guiding sheets between the loop folders from their associated knife folder or from the latter into one or the other of the loop folders, and means enabling sheets to pass one of said loop folders for delivery to the other knife folder.

8. A folding machine including two angularly related knife folders, a loop folder associated with each knife folder and adapted to receive sheets therefrom, and means enabling sheets delivered from one knife folder to pass its associated loop folder for delivery to the other knife folder.

9. A folding machine including two angularly related knife folders, a plurality of loop folders associated with each knife folder and selectively adapted to receive sheets therefrom, and means enabling sheets delivered from one knife folder to pass one of its associated loop folders for delivery to the other knife folder.

10. In a folding machine, a plurality of knife folders successively arranged at right angles to each other, a plurality of loop folders each parallel with, and adapted to receive sheets from, one of said knife folders, means providing for delivery of sheets from each knife folder to the following knife folder, and means for selectively deflecting sheets from the knife folders within or to one side of their associated loop folders for delivery directly out of the machine from each knife folder or each loop folder without further folding or travel through other folders.

11. In a folding machine, a series of knife folders successively arranged at right angles to each other, a series of loop folders each parallel with, and adapted to receive sheets from, one of said knife folders, sheet conveying means interposed between each loop folder and the following knife folder, a deflector at each knife folder adapted to deflect the sheets to one side of or into its associated loop folder, and means forming part of one loop folder and movable to enable sheets to pass said last mentioned loop folder from the preceding knife folder for delivery to the following knife folder.

12. In a folding machine, first, second and third folding mechanisms successively extending at right angles to each other and each comprising a knife folder and a loop folder, means for selectively deflecting sheets from the first knife folder into its associated loop folder or to one side of the latter for delivery to the following knife folder, means for delivering the sheets from the first knife folder to the second and third knife folders, and means for successively deflecting sheets from the second and third knife folders within or to one side of their associated loop folders for delivery directly out of the machine from the second or third knife folders or loop folders without further folding or travel through other folders.

13. In a folding machine, knife folders adapted to make a plurality of right angle folds in a sheet of paper, and loop folders associated with each of said knife folders and adapted to selectively make folds in different impositions parallel with the right angle fold made by the adjacent knife folder.

14. In a folding machine, knife folders adapted to make a plurality of right angle folds in a sheet of paper, loop folders associated with each of said knife folders and adapted to selectively make folds in different impositions parallel with the right angle fold made by the adjacent knife folder, and means for receiving the sheet without further folding thereof directly from each knife folder or any of its associated loop folders.

15. In combination, in a folding machine, a plurality of knife folders successively arranged at right angles to each other, a plurality of loop folding mechanisms each parallel with one of the knife folders and adapted to receive sheets therefrom, means for deflecting the sheets from one knife folder to another through parts of a loop folding mechanism without folding thereby, and stacker mechanism disposed below the loop folders.

16. In a folding machine, feeding mechanism, a plurality of folding means each extending at right angles to another and comprising a knife folder and a loop folding mechanism parallel with each knife folder and adapted to receive the sheets therefrom, and means for deflecting the sheets out of the machine directly from any one of the knife folders or loop folding mechanisms without having to pass the sheet through the entire machine.

17. In a folding machine, a plurality of folding units each extending at right angles to another and each consisting of a knife folding mechanism and a loop folding mechanism parallel with and adapted to receive sheets from said knife folding mechanism.

18. In a folding machine, a plurality of folding units each extending at right angles to another and each consisting of a knife folding mechanism and a loop folding mechanism parallel with and adapted to receive sheets from said knife folding mechanism, and means adapted to receive sheets from each loop folding mechanism and carry them to the succeeding knife folding mechanism.

19. In a folding machine, a plurality of folding units each extending at right angles to another and each consisting of a knife folding mechanism and a loop folding mechanism parallel with and adapted to receive sheets from said knife folding mechanism, and a plurality of means adapted to receive sheets from the loop folding mechanisms and carry said sheets to the knife folding mechanisms, said units and said means being disposed in different planes and the latter extending at angles to each other.

20. In a folding machine, a plurality of folding units each extending at right angles to another and each consisting of a knife folding mechanism and a loop folding mechanism parallel with said knife folding mechanism, deflector means for passing the sheets from the knife folding mechanisms to the loop folding mechanisms or directly out of the machine from the knife folding mechanisms, and means to receive the sheets from the loop folding mechanisms and carry them to the knife folding mechanisms, said units being disposed in different planes, and said knife folding mechanisms and loop folding mechanisms being driven from a common source of power and in synchronism with one another.

21. In a folding machine, a plurality of folding units each extending at right angles to another and consisting of a knife folding mechanism and a loop folding mechanism parallel with said knife folding mechanism, deflector means adapted to receive sheets from the knife folding mechanisms and deliver them directly from the machine or to said loop folding mechanisms, said units being disposed in different planes and said knife folding mechanisms and said loop folding mechanisms being driven from a common source of power and in synchronism with one another, and driven mechanism adapted to transport the sheets from each loop folding mechanism to a succeeding knife folding mechanism.

22. In a folding machine, a knife for folding a sheet of paper, a loop folding mechanism, feeding rollers cooperating with the knife to fold the paper and feed it toward the loop folding mechanism, a conveyor, and adjustable means for causing the paper, after passing through the feeding rollers, to pass into the loop folding mechanism or to permit it to pass to one side of said loop folding mechanism onto said conveyor, according to the position of said adjustable means.

23. In a folding machine, means for feeding a sheet of paper, a loop folding mechanism including a grid and a plurality of rollers, two of which act as feeding rollers and two of which act as folding rollers, and an adjustable deflector for directing the sheet of paper from said means either to one side of the loop folding mechanism or between the feeding rollers thereof, said grid being bodily adjustable to enable the paper to pass through the feeding rollers only or permit it to pass into the grid for folding by the folding rollers, according to the position of said grid.

24. In a folding machine, a pair of folding rollers, a knife for directing the paper between said folding rollers, a pair of feeding rollers, an adjustable deflector for directing said paper to one side of said feeding rollers or between them, according to the position of said deflector, a grid and another roller adapted to coact with one of said feeding rollers to impart another fold to said sheet of paper, said grid being bodily movable in opposite directions to enable the paper, after it passes between said feeding rollers, to either pass into the grid for folding or to pass through said feeding rollers without folding, according to the position of the grid.

25. In a folding machine, means for feeding a sheet of paper, and a loop folding mechanism adapted to receive the sheet of paper therefrom and having a grid bodily adjustable to guide and direct said sheet of paper through the folding rollers of the loop folding mechanism or permit the sheet to pass directly out of the feeding rollers of said loop folding mechanisms without passing through the grid and said folding rollers.

26. In a folding machine, a loop folder comprising rollers for feeding and folding a sheet of paper and a grid bodily adjustable to enable the paper to pass through the grid and the folding rollers or to permit the paper to pass through the feeding rollers without passing through the grid and said folding rollers.

27. In a folding machine, means for folding a sheet of paper, rollers for folding said paper after said first folding, means to feed said paper after the paper receives the first fold, and an adjustable grid which, when in the path of the paper fed by said feeding means, will receive and cause the paper to pass through said rollers, and when out of the path of the paper fed by said feeding means, will permit the paper to pass said rollers without travel through the same.

28. In a folding machine, means for folding a sheet of paper, means for imparting another fold to said paper after it has received the first mentioned fold, means for feeding the paper after it has received the first fold, and sheet receiving and stopping means which may be adjusted into and out of the path of the paper fed by said feeding means, said sheet receiving and stopping means, when adjusted into said path, causing the paper to change its course and pass into said second mentioned folding means, and when adjusted out of said path, permitting the paper to pass by said second mentioned folding means without changing its course.

In testimony whereof, I affix my signature.
ROBERT J. WATERWORTH.